United States Patent [19]

Grossman et al.

[11] Patent Number: 4,631,615
[45] Date of Patent: Dec. 23, 1986

[54] HEAD CLEANING CASSETTE FOR A VIDEO CASSETTE RECORDER

[75] Inventors: Craig B. Grossman, Minnetonka; Mark A. Schwartz, Crystal; Stanley S. Hammer, Minnetonka, all of Minn.

[73] Assignee: Video Dynamics, Inc., St. Louis Park, Minn.

[21] Appl. No.: 739,990

[22] Filed: May 31, 1985

[51] Int. Cl.⁴ .............................................. G11B 5/10
[52] U.S. Cl. .................................................... 360/128
[58] Field of Search .................. 360/128, 133, 137; 15/210 R

[56] References Cited

U.S. PATENT DOCUMENTS

| | | | |
|---|---|---|---|
| 3,439,922 | 4/1969 | Howard | 274/47 |
| 3,955,214 | 5/1976 | Post et al. | 360/128 |
| 3,958,273 | 5/1976 | Alexandrovich et al. | 360/128 |
| 3,997,919 | 12/1976 | Thompson | 360/137 |
| 4,100,643 | 7/1978 | Horian et al. | 15/246 |
| 4,135,219 | 9/1979 | Yoshizawa et al. | 360/128 |
| 4,141,053 | 2/1979 | Kara | 360/128 |
| 4,149,206 | 4/1979 | Loiselle | 360/128 |
| 4,207,644 | 6/1980 | Westran | 15/210 R |
| 4,211,580 | 7/1980 | Vowles | 360/137 X |
| 4,225,893 | 9/1980 | Loiselle | 360/128 |
| 4,272,796 | 6/1981 | Van Kreuningen et al. | 360/128 |
| 4,291,353 | 9/1981 | Fletcher et al. | 360/128 |
| 4,387,411 | 6/1983 | Clausen et al. | 360/128 |
| 4,388,663 | 6/1983 | Becella | 360/128 |
| 4,490,761 | 12/1984 | Wolynski et al. | 360/128 |
| 4,586,099 | 4/1986 | Suzuki et al. | 360/128 |

FOREIGN PATENT DOCUMENTS

| | | | |
|---|---|---|---|
| 0123124 | 10/1984 | European Pat. Off. | 360/128 |
| 3212730 | 9/1983 | Fed. Rep. of Germany | 360/128 |
| 2105300 | 3/1983 | United Kingdom | 360/137 |

OTHER PUBLICATIONS

Intermezzo–The Cleaning System–Dib Design Industrializzazione Brevetti
4 photographs of Bib Primary Examiner—Robert S. Tupper
Assistant Examiner—Andrew L. Sniezek
Attorney, Agent, or Firm—Merchant, Gould, Smith, Edell, Welter & Schmidt

[57] ABSTRACT

An automatic video cassette recorder cleaning cartridge includes an enclosed cleaning fluid aerosol cannister actuated via a solenoid and lever in order to release cleaning fluid onto a cleaning tape. Actuation of the solenoid follows from detection of the rotation of the pay-out spool, which includes a camming surface operative upon a momentary switch. A shift register is included to count the revolutions of the pay-out spool and to sound an alarm when a predetermined number of rotations are sensed, whereby the cleaning of the various heads and components of a VCR is accomplished by inserting the cleaner into the VCR and operating in play mode.

3 Claims, 5 Drawing Figures

HEAD CLEANING CASSETTE FOR A VIDEO CASSETTE RECORDER

TECHNICAL FIELD OF THE INVENTION

The present invention relates generally to cleaning apparatus for cleaning the components of a video cassette recorder, and more particularly to head cleaning apparatus in the form of a video cassette.

BACKGROUND OF THE INVENTION

Video cassette recorders, particularly the VHS recorders, have become very popular in recent years with millions of units now in household use. Video cassette recorders, or VCR's, are fairly complicated pieces of equipment with several sensitive components, such as the audio, video and erase heads. As some people realize, the components must be cleaned on a regular basis in order to avoid performance degradation, either in the recording mode of the playback mode, and to avoid excessive wear on the components as may result from a buildup of contaminants thereon. Unfortunately, it is either quite difficult or beyond the ability of the average VCR owner to gain direct access to the various components of a VCR which need to be cleaned, in particular the heads. Consequently, cleaning is typically accomplished with a VCR tape cassette carrying a cleaning tape (as opposed to a magnetic recording tape) which when "played" is thread around and passes over the various components of the system, whereby they are cleaned. Such cleaning tapes are typically utilized in conjunction with a cleaning fluid which may be applied to the tape prior to its insertion into the VCR.

While "manual" cleaning, i.e. the use of a cleaning tape cassette and the manual application of a cleaning fluid to the cleaning tape, provides satisfactory cleaning if properly performed, there are several potential drawbacks. For one, the cleaning fluids which are typically utilized are volatile, such that they evaporate quickly once applied to the tape. Thus, the amount of cleaning fluid which actually reaches the components of the VCR via the tape depends upon the amount of time between application of the fluid to the cleaning tape and the time at which the tape is drawn into contact with the components (either during threading or "play mode"). Because this delay is completely dependent on the operator, there is no guarantee that the optimum amount of fluid will reach the components. Similarly, the manual application of cleaning fluid to the cleaning tape can also result in either too much or too little fluid being applied. And, there is a tendency to leave the cleaning tape winding through the VCR longer than is required, potentially causing excessive head wear. Finally, the very inconvenience of having to maintain the cleaning fluid on hand and in an accessible location and the "technical" nature of the cleaning procedure both tend to discourage proper routine cleaning maintenance. Accordingly, there is a need for a self-contained, "automatic" cleaning cassette which eliminates or ameliorates the drawbacks to manual cleaning procedures.

SUMMARY OF THE INVENTION

The present invention provides a video cassette recorder (VCR) head cleaner cassette in which operation is substantially automatic. A video cassette tape housing is provided and includes therein a pay-out spool and a take-up spool having disposed therebetween a fluid-absorptive cleaning tape and guide means for guiding the tape between the spools along a path traversing the front end of the housing. Fluid applicator means for dispersing a cleaning fluid onto the cleaning tape is disposed inside the housing adjacent the tape path between the pay-out spool and the front end of the housing. A reservoir for holding supply of cleaning fluid is disposed within the housing and is connected through a valve to the applicator means whereby fluid may be selectively delivered to the applicator means by opening the valve. Detector means responsive to the rotation of one of the spools is provided to produce an electrical signal indicating that the tape is being wound from spool to spool by the threading or winding mechanism of a video cassette recorder. A valve control is responsive to one of the electrical signals to open the valve temporarily and thereby cause cleaning fluid to be applied to the tape. The apparatus also includes an audible alarm for indicating that a desired length of cleaning tape has been drawn over the components, whereby the user is alerted to remove the head cleaning apparatus from the video cassette recorder.

According to one aspect of the invention, the reservoir means consists of an aerosol can, and the valve that associated with the aerosol can. According to another aspect of the invention, the detector means consists of a switch responsive to a camming surface on one of the spools, whereby the switch is periodically closed as the spool rotates. According to yet another aspect of the invention, a solenoid is provided and provides, through a lever, the force required to open the valve means on the aerosol can and thereby apply cleaning fluid to the cleaning tape. These and other aspects of the invention will be described in more detail below.

DETAILED DESCRIPTION OF THE INVENTION

Figure 2:
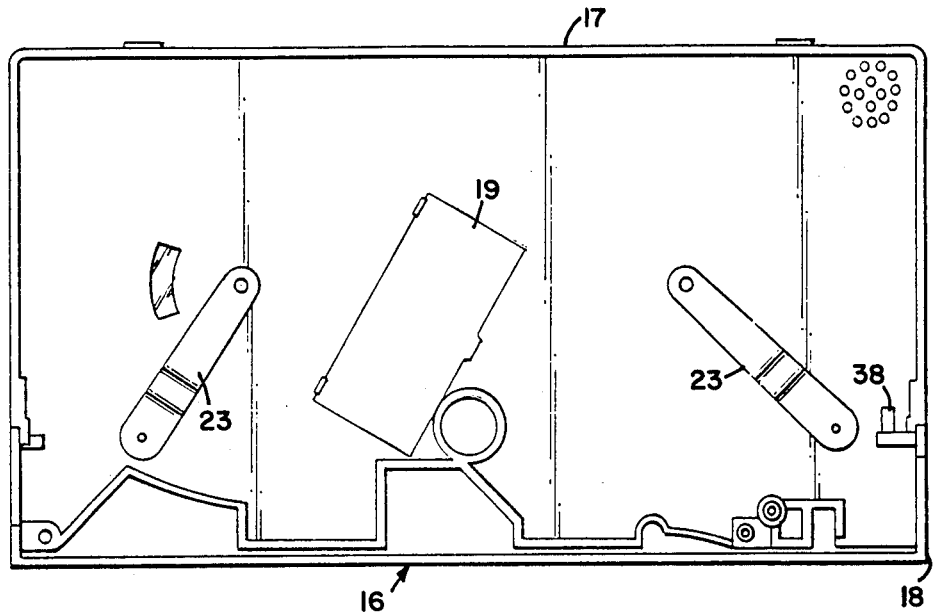
FIG. 2 is a plan view of the top half of the cleaning cassette according to the present invention.
Figure 1:
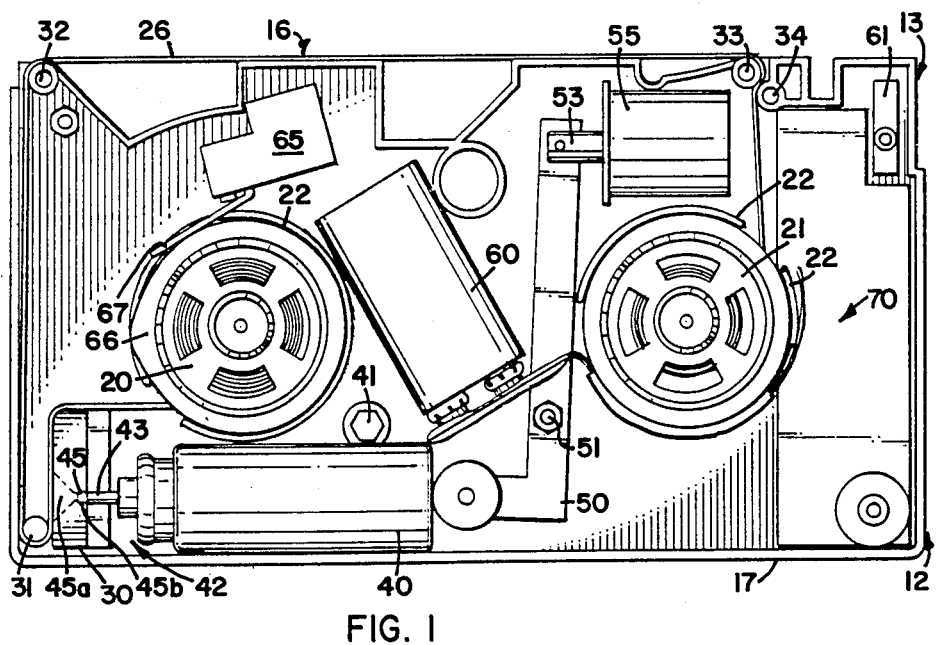
FIG. 1 is a plan view of the bottom half of the cleaning cassette according to the present invention.
Figure 3:
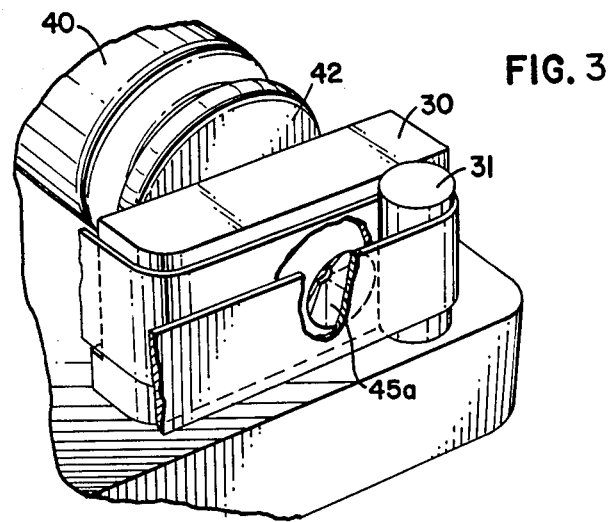
FIG. 3 is a partial cutaway view of the cleaning fluid applicator taken along the lines 2—2 of FIG. 1.

Referring to FIGS. 1, 2, 3, and 4, there is shown the video cassette recorder (VCR) cleaning cassette 10 according to the present invention. The cleaning cassette includes a housing 12, which consists of a bottom half member 13 and top half member 14. Preferably, as shown in FIG. 1, the bottom half member 13 includes mounted therein for free rotation within circular guides 22 a pay-out spool 20 and a take-up spool 21. Additionally, detent members 23 may be provided on top half 14 to exert an axial stabilizing force and a small amount of drag on spools 20 and 21.

Disposed between spools 20 and 21 is a liquid absorptive cleaning tape 26 (preferably a spun bound polyester composition), which in a normal mode of operation is paid out from spool 20, travels around the front face of a fluid applicator member 30, around guide pins 31 and 32, traverses the front end 16 of housing 12 (where it is accessible to the VCR) and finally between guide pins 33 and 34 back to take-up spool 21. In the embodiment disclosed herein, the cassette 10 is configured for operation in a VHS VCR, although those skilled in the art will recognize that cassette 10 could be adapted if desired for operation in a Betamax VCR.

An aerosol cannister 40 containing head and component cleaning fluid, preferably freon, for application to tape 26 is disposed along the rear end of housing 14 between its back wall 17 and a retaining member 41. The nozzle 43 extending from valve 42 of can 40 projects slightly into a passage 45 in member 30 which includes a conical or funnel-shaped outlet 45a on the opposite side thereof, with a narrowed passage section 45b between the inlet end and conical outlet. Preferably, the narrowed portion of passageway 45 has a diameter which is equal to the inside diameter of nozzle 43. A lever 50 is pivoted at a hinge or fulcrum point 51 and connected on its other end to the actuator or plunger 53 of a solenoid 55. Thus, with cover member 14 secured to the bottom member 13 of housing 12, cannister 40 is cradled in position with its only significant freedom of movement in a direction towards applicator member 30. Thus, the activation of solenoids 55 and the consequent retraction of plunger 53 causes lever 50 to press against the rear end of cannister 40, press nozzle 43 against the narrowed portion of passage 45, thus opening the valve 42 and releasing cleaning fluid through nozzle 43 into aperture 45, the funnel-shaped outlet passage of which guides the spray of cleaning fluid onto tape 26.

Figure 4:
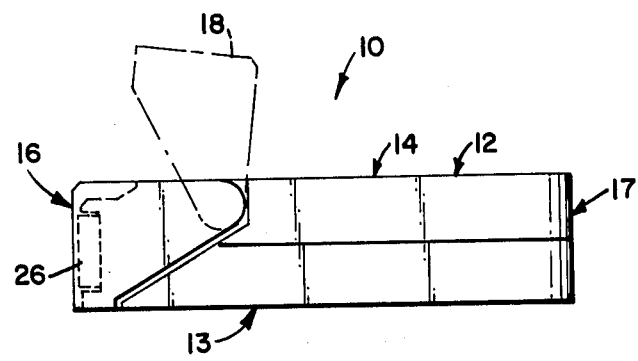
FIG. 4 is a partial cutaway view of the hinged tape cover taken along the lines 3—3 of FIG. 1.
Figure 5:
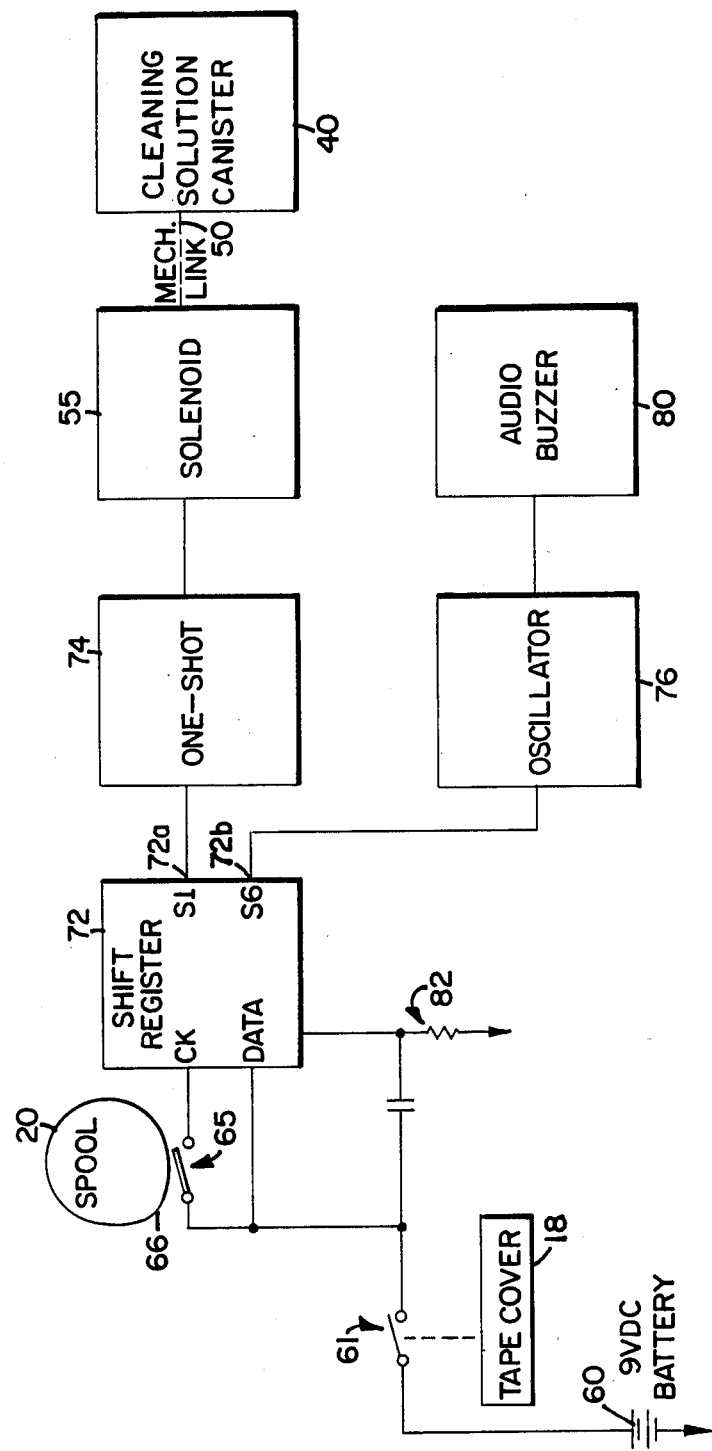
FIG. 5 is a schematic block diagram of the electronic circuitry of the video cassette cleaner according to the present invention.

The electronic circuitry which provides for the control of solenoid 55 will now be described. Battery 60, preferably a 9-volt battery, is provided to supply power to the various electrical components of the system. Battery 60 is removably snap-mounted in housing 12, which includes a removable door 19 in top half 14 via which battery 60 may be installed or removed. The application of power is accomplished through momentary switch 61, which is positioned inside the housing 12 near the corner so as to be activated by a lever 38 on the tape cover 18 as it is lifted up when the cassette 10 is inserted in a VCR. This component, together with the other electrical components of the system, may also be seen in FIG. 4 in schematic diagram form. A further switch 65 is provided, and is also a momentary switch. Switch 65 is disposed alongside spool 20, which includes a camming surface 66 operative on lever member 67, which in turn momentarily activates switch 65 once for every revolution of spool 20. The remaining electrical components of the system are mounted on circuit module 70. As shown in FIG. 4, those components include a shift register 72 (preferably a CMOS 4015), a one shot 74, an oscillator 76, and an audio buzzer 80 (also shown in FIG. 1).

Operation

In operation, the present invention provides for the automatic application of cleaning fluid from cannister 40 onto the cleaning tape 26 in response to the "playing" of the cassette 10 in a VCR and for an audible alarm after a predetermined number of rotations of pay-out spool 20, to alert the operator to remove the cassette. More specifically, cassette 10 may be used to clean the interior components of a VCR as follows. The VCR is powered up, and cassette 10 is simply inserted into the VCR for operation. Upon insertion, tape cover 18 is flipped up by the internal VCR mechanisms, exposing tape 26 and activating the circuit of the present invention via switch 61. Instantaneously with the closing of switch 61, a reset pulse is applied to the reset input of shift register 72 via RC network 82, whereby the shift register is reset with the stage 1 (S1) output 72a and stage 6 (S6) output 72b in an initialized or zeroed condition. Also upon closing of switch 61, a logic 1 voltage is applied to the DATA input of shift register 72, such that each time a signal is applied to the clocking input (CK) via switch 65 a logic 1 is shifted into shift register 72. Thus, between the time cassette 10 is inserted in the VCR and the time that the cassette is "played" and/or tape 26 is drawn away for threading by the VCR threading components, shift register 72 is initialized for operation. It should be noted that for VHS recorders, for which the present embodiment of the invention is adapted, threading of the tape 26 does not occur until "play" (or "record") mode is engaged. However, in certain, if not all, Betamax models, threading is initiated as soon as the cassette is inserted. In either case, as tape 26 is drawn away from cassette 10 for threading, it is paid out from spool 20 (spool 21 is held in place during this process) causing it to rotate and causing switch 65 to be closed momentarily as camming surface 66 works on lever 67. Upon the first closing of switch 65, the stage 1 output (S1) of shift register 72 is set high, activating one shot 74, which preferably delivers a three-quarter second activation pulse to solenoid 55. Consequently, solenoid 55 fires for three-quarters of a second, causing cannister 40 to spray cleaning fluid for the duration. Consequently, a length of tape 26 is wetted as it is drawn from cassette 10 away from pay-out spool 20 to be threaded and drawn around the heads and other components.

Where threading occurs automatically upon insertion of cassette 10 into the VCR, the operator should, as soon as the threading is accomplished, engage the VCR into the "play" mode, whereby cleaning tape 26 continues to be drawn from pay-out spool 20 even after threading. Where threading does not occur until "play" mode has been entered (most VHS units), the VCR will automatically transition from threading to "play" mode. In "play" mode, spool 21 is engaged by the take-up spindle of the VCR to take up tape 26, while spool 20 continues to pay it out. Each rotation of spool 20 causes the shifting of an additional "1" into the shift register, until after six revolutions of spool 20, stage 6 (S6) 72b of shift register 72 is loaded with a "1" and activates oscillator 76 which in turn drives audio buzzer 80 to alert the operator that the cleaning operation is complete, and to remove the cassette 10 from the VCR. Audio buzzer 80 will remain activated until the cassette 10 is removed from the VCR, whereby the deactivation or opening of switch 61 will deactivate the entire circuit, including audio buzzer 80.

It has been found that six revolutions of spool 20 result in the pay-out of approximately ten to fifteen inches of cleaning tape, assuming a relatively small amount of cleaning tape is disposed on spool 20. Of course, larger amounts of cleaning tape would translate into greater lengths of tape being paid out per revolution, and vice versa. At any rate, however, the cleaning cassette 10 according to the present invention generally provides that a first short length, or about one to two inches, of tape is wetted with cleaning fluid automatically as tape 26 is first drawn away via the threading mechanism of the VCR. The wetted portion of tape is typically drawn across the VCR erase head, and typically pauses somewhere on the video head as threading is completed, before its continued passage over the video head, audio head, and other cleanable components in response to "play" mode tape travel. Preferably, the length of tape which is paid out before the alarm is activated is enough to return the wetted tape segment back to spool 21. Consequently, cleaning fluid is applied to the various heads and guide/drive components as the wetted tape segment is drawn therethrough, with dry tape following thereafter to pick up dissolved and dislodged contamination therefrom. In the preferred embodiment, enough tape and fluid is provided to accomplish thirty cleaning operations or about two years worth. When the tape runs out, the unit is simply thrown out. However, if desired, the battery 60 may be removed beforehand.

Thus, the present invention provides a VCR cleaning cassette 10 which provides for the accurate dispensing of the appropriate amount of cleaning fluid, for the optimum length of cleaning tape to be drawn past the components, and for a simple, easy to use cleaning system whereby regular cleaning of VCR's will be encouraged.

Although the present invention has been illustrated herein in preferred form, those skilled in the art will recognize that various modifications or additions may be made thereto without departing from the spirit and scope of the invention as set forth in the claims appended hereto.

What is claimed is:

1. Head cleaning apparatus for use in cleaning the heads of a video cassette recorder, comprising:
   (a) video cassette tape housing means including means for supporting a pay-out spool and a take-up spool adapted to be rotated by the winding mechanism of a video cassette recorder, a fluid absorptive cleaning tape disposed between said spools and guide means for guiding said tape between said spools along a tape path traversing the front end of said housing means;
   (b) fluid applicator means for dispersing a cleaning fluid onto said cleaning tape, said applicator means disposed inside said housing means adjacent said tape path between said pay-out spool and said front end;
   (c) reservoir means for holding a supply of head cleaning fluid disposed within said housing means;
   (d) valve means for selectively connecting said reservoir means in fluid communication with said applicator means so that cleaning fluid may be selectively delivered to said applicator means by opening said valve means;
   (e) detector means responsive to the rotation of one of said spools for producing an electrical signal indicating that said tape is being wound from spool to spool by the winding mechanism of a video cassette recorder;
   (f) means responsive to said electrical signal for opening said valve means temporarily and thereby cause cleaning fluid to be applied to said tape; and
   (g) audible alarm means for indicating that a desired head cleaning time interval has elapsed from the time that cleaning fluid was applied to said tape, whereby the user is alerted to remove the head cleaning apparatus from the video cassette recorder.

2. Head cleaning apparatus for use in cleaning the heads of a video cassette recorder, comprising:
   (a) video cassette tape housing means including means for supporting a pay-out spool and a take-up spool adapted to be rotated by the winding mechanism of a video cassette recorder, a fluid absorptive cleaning tape disposed between said spools along a tape path traversing the front end of said housing means;
   (b) fluid applicator means for dispersing a cleaning fluid onto said cleaning tape, said applicator means disposed inside said housing means adjacent said tape path between said pay-out spool and said front end;
   (c) reservoir means for holding a supply of head cleaning fluid disposed within said housing means;
   (d) valve means for selectively connecting said reservoir means in fluid communication with said applicator means so that cleaning fluid may be selectively delivered to said applicator means by opening said valve means;
   (e) detector means responsive to the loading of said housing means into a video cassette recorder and to the rotation of one of said spools for producing an electrical signal indicative thereof;
   (f) means responsive to said electrical signal to open said valve means temporarily and thereby causing cleaning fluid to be applied to said tape; and
   (g) audible alarm means for indicating that a desired head cleaning time interval has elapsed from the time that cleaning fluid was applied to said tape, whereby the user is alerted to remove the head cleaning apparatus from the video cassette recorder.

3. Head cleaning apparatus for use in cleaning the heads of a video cassette recorder, comprising:
   (a) video cassette tape housing means including means for supporting a pay-out spool and a take-up spool adapted to be rotated by the winding mechanism of a video cassette recorder, a fluid absorptive cleaning tape disposed between said spools and guide means for guiding said tape between said spools along a tape path traversing the front end of said housing means;
   (b) fluid applicator means for dispersing a cleaning fluid onto said cleaning tape, said applicator means disposed inside said housing means adjacent said tape path between said pay-out spool and said front end;
   (c) reservoir means for holding a supply of head cleaning fluid disposed within said housing means;
   (d) valve means for selectively connecting said reservoir means in fluid communication with said applicator means so that cleaning fluid may be selectively delivered to said applicator means by opening said valve means;
   (e) detector means responsive to the rotation of one of said spools for producing electrical signals indicating that said tape is being wound from spool to spool by the winding mechanism of a video cassette recorder, said detector means including a camming surface on said one spool and a momentary switch positioned adjacent said one spool so that it is closed as said camming surface rotates past;
   (f) solenoid and lever means responsive to one or more of said electrical signals for opening said valve means temporarily and thereby cause cleaning fluid to be applied to said tape; and
   (g) audible alarm means responsive to a predetermined number of signals from said detector means for indicating that a desired head cleaning time interval has elapsed from the time that cleaning fluid was applied to said tape, whereby the user is alerted to remove the head cleaning apparatus from the video cassette recorder.

* * * * *